(12) United States Patent
Choi et al.

(10) Patent No.: US 8,925,176 B2
(45) Date of Patent: Jan. 6, 2015

(54) STRUCTURE FOR CONNECTING REFRIGERANT PIPE AND AIR CONDITIONER HAVING THE SAME

(75) Inventors: Sun Muk Choi, Suwon-si (KR); Ji Ho Kwak, Suwon-si (KR); Sang Yong Lee, Gunpo-si (KR); Jae Soo Jeong, Suwon-si (KR); Seong Ho Kil, Seongnam-si (KR); Seok Kyun Kim, Hwaseong-si (KR); Eun Soo Jeon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 183 days.

(21) Appl. No.: 13/370,800

(22) Filed: Feb. 10, 2012

(65) Prior Publication Data

US 2012/0211209 A1    Aug. 23, 2012

(30) Foreign Application Priority Data

Feb. 21, 2011  (KR) .................. 10-2011-0015118
Jul. 26, 2011  (KR) .................. 10-2011-0074071

(51) Int. Cl.
| | | |
|---|---|---|
| *B23Q 3/00* | (2006.01) | |
| *B23P 19/04* | (2006.01) | |
| *F16L 55/115* | (2006.01) | |
| *F16L 55/11* | (2006.01) | |
| *F25B 41/00* | (2006.01) | |
| *F16L 19/08* | (2006.01) | |
| *F24F 1/32* | (2011.01) | |

(52) U.S. Cl.
CPC ............... *F24F 1/32* (2013.01); *F16L 55/1152* (2013.01); *F24F 2221/32* (2013.01); *F16L 55/1108* (2013.01); *F25B 41/003* (2013.01); *F16L 19/086* (2013.01)
USPC .................. 29/464; 29/467; 29/468; 29/469; 29/451; 29/559; 29/237; 29/235; 29/281.5

(58) Field of Classification Search
USPC ........... 29/464, 466, 467, 468, 469, 235, 237, 29/271, 281.5, 282, 559, 222, 451; 62/511, 527; 251/118; 137/513.3
See application file for complete search history.

(56) References Cited

U.S. PATENT DOCUMENTS 3,289,286 A * 12/1966 Belanger ......................... 29/235
3,312,484 A *  4/1967 Davenport .................... 285/340

(Continued)

FOREIGN PATENT DOCUMENTS

DE       2624425       12/1977
EP       0 294 948     12/1988

(Continued)

OTHER PUBLICATIONS

Extended European Search Report for 12154108.0, mailed Jun. 18, 2012.

(Continued)

*Primary Examiner* — Essama Omgba
(74) *Attorney, Agent, or Firm* — Staas & Halsey LLP

(57) ABSTRACT

A structure to connect a refrigerant pipe and an air conditioner having the same, the connecting structure enabling a refrigerant pipe to be easily connected to an indoor unit or an outdoor unit of an air conditioner and including a refrigerant pipe through which refrigerant flows, a socket part connected to one end of the refrigerant pipe, and a coupling nut coupled to an outer circumferential surface of the socket part, wherein, a socket part is provided with a grip-ring allowing the refrigerant pipe to move in a first direction in which the refrigerant pipe is coupled to the socket part and preventing the refrigerant pipe from moving in a second direction in which the refrigerant pipe is separated from the socket part, and at least one O-ring configured to prevent refrigerant from leaking at the socket part.

3 Claims, 15 Drawing Sheets

(56) References Cited

U.S. PATENT DOCUMENTS

| | | | |
|---|---|---|---|
| 3,563,575 A * | 2/1971 | Sanford | 285/323 |
| 4,009,590 A * | 3/1977 | Webb et al. | 62/180 |
| 4,072,328 A * | 2/1978 | Elliott | 285/148.28 |
| 4,635,975 A * | 1/1987 | Campbell | 285/340 |
| 4,644,973 A | 2/1987 | Itoh et al. | |
| 4,653,291 A * | 3/1987 | Moeller et al. | 62/511 |
| 5,507,468 A * | 4/1996 | Evans | 251/118 |
| 5,603,530 A * | 2/1997 | Guest | 285/105 |
| 5,655,750 A * | 8/1997 | Smock et al. | 251/148 |
| 5,893,273 A * | 4/1999 | Casiraghi | 62/511 |
| 6,012,209 A * | 1/2000 | Whetstone | 29/235 |
| 6,050,295 A * | 4/2000 | Meisinger et al. | 137/541 |
| 6,450,550 B1 * | 9/2002 | Cornwell | 285/340 |
| 6,499,771 B1 * | 12/2002 | Snyder et al. | 285/319 |
| 6,560,987 B2 * | 5/2003 | Kreger et al. | 62/511 |
| 6,913,292 B2 * | 7/2005 | Snyder et al. | 285/340 |
| 7,096,551 B2 * | 8/2006 | Lackowski, II | 29/235 |
| 7,121,593 B2 * | 10/2006 | Snyder et al. | 285/340 |
| 7,290,319 B2 * | 11/2007 | Higgins | 29/435 |
| 7,370,673 B2 * | 5/2008 | Trumbower et al. | 137/883 |
| 7,404,538 B2 * | 7/2008 | Gill et al. | 251/118 |
| 7,500,699 B2 * | 3/2009 | Snyder et al. | 285/340 |
| 7,617,991 B2 * | 11/2009 | Wells et al. | 239/5 |
| 7,900,974 B1 * | 3/2011 | Plattner | 285/332.1 |
| 8,035,475 B2 * | 10/2011 | Tierney et al. | 338/55 |
| 2002/0069668 A1 * | 6/2002 | Kreger et al. | 62/511 |
| 2002/0185868 A1 * | 12/2002 | Snyder et al. | 285/374 |
| 2003/0067170 A1 * | 4/2003 | Snyder et al. | 285/340 |
| 2003/0071460 A1 * | 4/2003 | Snyder et al. | 285/340 |
| 2004/0178630 A1 * | 9/2004 | Davidson | 285/321 |
| 2005/0146133 A1 * | 7/2005 | Snyder et al. | 285/105 |
| 2005/0251982 A1 * | 11/2005 | Lackowski | 29/235 |
| 2006/0237962 A1 | 10/2006 | Anderson et al. | |
| 2006/0265852 A1 * | 11/2006 | Snyder et al. | 29/451 |

FOREIGN PATENT DOCUMENTS

| | | | | |
|---|---|---|---|---|
| EP | 1 848 912 B1 | | 7/2009 | |
| EP | 1848912 | | 7/2009 | |
| EP | 2615387 A1 * | | 7/2013 | F24F 1/32 |
| GB | 2 095 780 A | | 10/1982 | |
| GB | 2095780 | | 10/1982 | |
| GB | 2184186 A * | | 6/1987 | F16L 19/06 |
| JP | 11082848 A * | | 3/1999 | F16L 37/12 |
| NL | 7606111 | | 12/1977 | |

OTHER PUBLICATIONS

Extended European Search Report dated Jun. 13, 2013 in corresponding European Patent Application No. 13161761.5.

* cited by examiner

STRUCTURE FOR CONNECTING REFRIGERANT PIPE AND AIR CONDITIONER HAVING THE SAME

CROSS-REFERENCE TO RELATED APPLICATIONS

This application claims the priority benefit of Korean Patent Applications No. 10-2011-0015118, filed on Feb. 21, 2011, and No. 10-2011-0074071, filed on Jul. 26, 2011 in the Korean Intellectual Property Office, the disclosures of which are incorporated herein by reference.

BACKGROUND

1. Field

Embodiments of the present disclosure relate to a structure to connect a refrigerant pipe and an air conditioner having the same, and more particularly, to an improved structure for a refrigerant pipe connecting an indoor unit and an outdoor unit that form an air conditioner, and an air conditioner having the same.

2. Description of the Related Art

An air conditioner is an appliance that absorbs heat from ambient air by evaporating refrigerant at room temperature and discharging the absorbed heat to another system. The air conditioner includes an evaporator, a compressor, a condenser, and a capillary tube. The evaporator cools the ambient air by evaporating the refrigerant. The compressor compresses the refrigerant gas passing through the evaporator with high temperature and high pressure. The condenser condenses the refrigerant gas, which has been compressed by the compressor, into liquid refrigerant with room temperature. The capillary tube decreases the pressure of the liquid refrigerant having high pressure.

Air conditioners are divided into separation type air conditioners and integral type air conditioners. The separation type air conditioner includes an indoor unit and an outdoor unit. The indoor unit is installed indoors, and draws indoor air into the unit to allow the drawn air to exchange heat with refrigerant, and discharges the heat-exchanged air to the indoors. The outdoor unit allows refrigerant introduced from the indoor unit to exchange heat with outdoor air such that the refrigerant is in a state available for heat exchange with indoor air, and then provides the refrigerant to the indoor unit. The indoor unit and the outdoor unit are connected to each other by a refrigerant pipe through which refrigerant flows.

There is a need for a structure to connect a refrigerant pipe that is easily connected, while preventing refrigerant from leaking when the refrigerant pipe is connected to an indoor unit or an outdoor unit, or when the refrigerant pipe is connected to another refrigerant pipe to form an extended refrigerant pipe.

SUMMARY

Therefore, it is an aspect of the present disclosure to provide a structure to connect a refrigerant pipe and an air conditioner having the same, the connecting structure enabling a refrigerant pipe to be easily connected to an indoor unit or an outdoor unit of an air conditioner.

It is another aspect of the present disclosure to provide a structure to connect a refrigerant pipe, the structure improving the hermeticity between a refrigerant pipe, which is connected to an indoor unit or an outdoor unit of an air conditioner, and the indoor unit and the outdoor unit, and an air conditioner having the same.

It is another aspect of the present disclosure to provide a structure to connect a refrigerant pipe implemented using a refrigerant pipe, including aluminum or an aluminum alloy as well as copper, and an air conditioner having the same.

Additional aspects of the disclosure will be set forth in part in the description which follows and, in part, will be obvious from the description, or may be learned by practice of the disclosure.

In accordance with one aspect of the present disclosure, a structure to connect a refrigerant pipe includes a refrigerant pipe, a socket part, and a coupling nut. The refrigerant pipe allows refrigerant to flow therethrough. The socket part is connected to one end of the refrigerant pipe. The coupling nut is coupled to an outer circumferential surface of the socket part. The socket part is provided with a grip-ring and at least one O-ring. The grip-ring allows the refrigerant pipe to move in a first direction in which the refrigerant pipe is coupled to the socket part and preventing the refrigerant pipe from moving in a second direction in which the refrigerant pipe is separated from the socket part. The at least one O-ring is configured to prevent the refrigerant from leaking at the socket part.

The connecting structure may further include a washer provided between the grip-ring and the O-ring to prevent the O-ring from being damaged.

The at least one O-ring may include a first O-ring making contact with the washer and a second O-ring making contact with the first O-ring to maintain a hermetic seal of the socket part in cooperation with the first O-ring.

The socket part may include a first accommodation portion configured to accommodate the refrigerant pipe, and a second accommodation portion forming a step in cooperation with the first accommodation portion and configured to accommodate the grip-ring, the washer, and the at least one O-ring.

The second accommodation portion may include a projection configured to prevent the coupling nut from being excessively coupled to the socket part, the projection extending in a longitudinal direction of the second accommodation portion.

The coupling nut may include a pressing projection configured to press the at least one O-ring, and an accommodation groove configured to accommodate the projection.

The refrigerant pipe may have a surface that is formed using aluminum or an aluminum alloy which is coated with synthetic resin.

The connecting structure may further include an assembling jig configured to insert the grip-ring, the washer, and the at least one O-ring into the socket part. The assembling jig includes a coupling portion provided on an outer circumferential surface of the assembling jig such that the coupling portion is coupled to the grip-ring, the washer, and the at least one O-ring, and a support protrusion protruding along a circumference of the outer circumferential surface of the assembling jig to support the grip-ring, the washer, and the at least one O-ring in one direction.

The connecting structure may further include an assembling jig configured to insert the grip-ring, the washer, and the at least one O-ring into the socket part. The assembling jig includes a first jig side accommodation portion provided inside the assembling jig to accommodate the refrigerant pipe, and a second jig side accommodation portion forming a step in cooperation with the first jig side accommodation portion and accommodating the grip-ring, the washer, and the at least one O-ring.

The grip-ring may include a flange provided in the shape of a ring, and a grip piece extending radially inward from the flange.

In accordance with another aspect of the present disclosure, an air conditioner includes a refrigerant pipe and a connection apparatus. The refrigerant pipe is configured to connect the indoor unit to the outdoor unit. The connection apparatus is provided on the indoor unit or the outdoor unit to control refrigerant that inflows and outflows into the indoor unit or the outdoor unit. The connection apparatus includes a socket part connected to one end of the refrigerant pipe, a grip-ring coupled to an inner circumferential surface of the socket part to prevent the refrigerant pipe from being separated from the socket part, at least one O-ring disposed at a rear side of the grip-ring to prevent refrigerant from leaking, and a connecting unit coupled to an outer circumferential surface of the socket part to press the O-ring.

The air conditioner may further include a washer provided between the grip-ring and the O-ring to prevent the O-ring from being damaged.

The refrigerant pipe may have a surface that is formed using aluminum or an aluminum alloy coated with synthetic resin.

The at least one O-ring may include a first O-ring making contact with the washer and a second O-ring making contact with the first O-ring to maintain a hermetic seal of the socket part in cooperation with the first O-ring.

The socket part may include a first accommodation portion communicating with the refrigerant pipe; and a second accommodation portion configured to accommodate the grip-ring, the washer, and the at least one O-ring and provided with a projection extending in a longitudinal direction of the second accommodation portion.

The connecting unit may include a support portion, a stepped portion protruding from the support portion in a connecting direction of the connecting unit such that a step is formed, a through-hole penetrating a center of the step portion to allow the refrigerant pipe to pass therethrough, a connecting portion extending from a periphery of the support portion in the connecting direction of the connecting unit, and an accommodation groove provided between the connecting portion and the stepped portion to accommodate the projection.

In accordance with another aspect of the present disclosure, a method of connecting a refrigerant pipe of an air conditioner having an indoor unit and an outdoor unit is as follows. A coupling nut is separated. The coupling nut is coupled to an outer circumferential surface of a refrigerant pipe connection part of the indoor unit or the outdoor unit. A grip-ring, at least one O-ring, and a washer are inserted into the refrigerant pipe connection part. The grip-ring is configured to prevent the refrigerant pipe from being separated. The at least one O-ring is configured to prevent refrigerant from leaking. The washer is configured to prevent the O-ring from being damaged. The coupling nut is coupled to an outer circumferential surface of the refrigerant pipe connection part in a loosely fastening state of the coupling nut. The refrigerant pipe is inserted into the refrigerant pipe connection part by passing through through-holes, which are respectively formed in centers of the grip-ring, the washer, and the O-ring. The coupling nut is fastened to at least a predetermined torque such that the coupling nut presses the O-ring inward to the refrigerant pipe connection part.

The air conditioner may further include an assembling jig configured to couple the grip-ring, the washer, and the at least one O-ring to the refrigerant pipe connection part. The assembling jig is inserted into the refrigerant pipe connection part in a state that the assembling jig has the grip-ring, the washer, and the O-ring coupled to an outer circumferential surface thereof. The assembling jig is separated from the refrigerant pipe connection part via a hole formed through the coupling nut when the coupling nut is in the loosely fastened state.

In accordance with another aspect of the present disclosure, a method of connecting a refrigerant pipe of an air conditioner having an indoor unit and an outdoor unit is as follows.

A grip-ring, at least one O-ring, a washer, and a coupling nut are coupled to an outer circumference surface of the refrigerant pipe of the indoor unit or the outdoor unit. The grip-ring is configured to prevent the refrigerant pipe from being separated. The at least one O-ring is configured to prevent refrigerant from leaking. The washer is configured to prevent the at least one O-ring from being damaged. The coupling nut is configured to couple the refrigerant pipe.

The refrigerant pipe, the grip-ring, the washer, and the O-ring are inserted into the refrigerant pipe connection part in a state that the grip-ring, the washer, the O-ring, and the coupling nut are coupled to the refrigerant pipe.

The coupling nut on the refrigerant pipe is coupled to an outer side of the refrigerant pipe connection part, and the coupling nut is fastened to at least a predetermined torque such that the coupling nut presses the O-ring to an inner side of the refrigerant pipe connection part.

The air conditioner may further include an assembling jig configured to couple the grip-ring, the washer, and the at least one O-ring to the refrigerant pipe connection part. The assembling jig allows the grip-ring to be fixed to an outer side of the refrigerant pipe inside the assembling jig. The assembling jig is separated from the refrigerant pipe in a state that the grip ring is fixed to the outer side of the refrigerant pipe.

In accordance with another aspect of the present disclosure, an assembling jig, which is configured to connect a refrigerant pipe to a refrigerant pipe connection part of an air conditioner having an indoor unit and an outdoor unit, includes a first jig side accommodation portion and a second jig side accommodation portion. The first jig side accommodation portion is provided inside the assembling jig to accommodate the refrigerant pipe. The second jig side accommodation portion is configured to form a step in cooperation with the first jig side accommodation portion and to accommodate a separation preventing member and a leakage preventing member. The separation preventing member is configured to prevent the refrigerant pipe, which is connected to the refrigerant pipe connection part, from being separated from the refrigerant pipe connection part. The leakage preventing member is configured to prevent refrigerant from leaking between the refrigerant pipe connection part and the refrigerant pipe.

The separation preventing member may be a grip-ring which includes metal and the leakage preventing member may be an O-ring which includes rubber.

A washer may be disposed between the grip-ring and the O-ring to prevent the O-ring from being damaged.

In accordance with an aspect of the present disclosure, a structure to connect a refrigerant pipe includes a refrigerant pipe configured to allow refrigerant to flow therethrough, a socket part connected to one end of the refrigerant pipe, and a coupling nut coupled to an outer circumferential surface of the socket part. The socket part is provided with a grip-ring, which is configured to prevent the refrigerant pipe from being separated from the socket part, and at least one O-ring configured to prevent refrigerant from leaking at the socket part.

As described above, the embodiments of the present disclosure simplify a process of connecting a refrigerant part, thereby reducing the time required for the connection work.

In addition, the embodiments of the present disclosure ensure the hermeticity between a refrigerant pipe, which is connected to an indoor unit or an outdoor unit of an air conditioner, and the indoor unit and the outdoor unit, thereby effectively preventing refrigerant from leaking.

In addition, an embodiment of the present disclosure uses a refrigerant pipe, including aluminum or an aluminum alloy, for example, that may be coated with another material.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
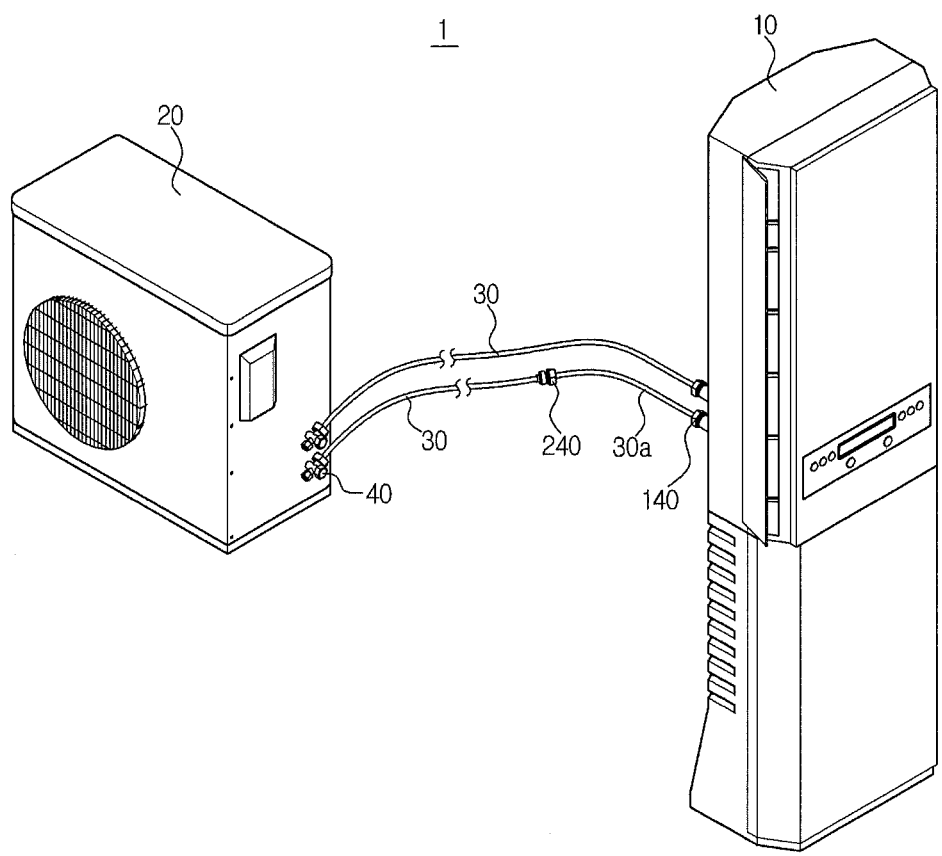
FIG. 1 is a view illustrating a refrigerant pipe connecting an indoor unit and an outdoor unit that form an air conditioner.

Reference will now be made in detail to the embodiments of the present disclosure, examples of which are illustrated in the accompanying drawings, wherein like reference numerals refer to like elements throughout.

FIG. 1 is a view illustrating a refrigerant pipe connecting an indoor unit and an outdoor unit that form an air conditioner.

Referring to FIG. 1, an air conditioner 1 includes an indoor unit 10, which is installed indoors and provided with an evaporator and a blower fan, and an outdoor unit 20, which is installed outdoors and provided with a compressor and a condenser. The indoor unit 10 is connected to the outdoor unit 20 through a refrigerant pipe 30.

The refrigerant pipe 30 includes a high pressure refrigerant pipe and a low pressure refrigerant pipe. A refrigerant gas is compressed to a high pressure and a high temperature by a compressor inside the outdoor unit 20. The refrigerant gas experiences a heat exchange through a blower fan and a condensation effect to form a high pressure refrigerant liquid. The high pressure refrigerant liquid is transferred to the indoor unit through the high pressure refrigerant pipe and then the pressure of the refrigerant liquid is decreased by passing through an expansion valve. Meanwhile, the refrigerant introduced to an evaporator of the indoor unit 10 is evaporated to absorb heat from ambient air. In this case, cool air, which is formed through the absorption of heat by the evaporator, is discharged to the indoors through a blower fan disposed adjacent to the evaporator, and a low pressure refrigerant gas, which has been evaporated by the evaporator, is transferred to the outdoor unit 20 through the low pressure refrigerant pipe.

The refrigerant pipe 30, including the high pressure refrigerant pipe and the low pressure refrigerant pipe is connected to the indoor unit 10 or the outdoor unit 20, or another refrigerant pipe 30a through connection apparatuses, including a service valve 40, a connection apparatus 140, and a connection apparatus 240.

Figure 2:
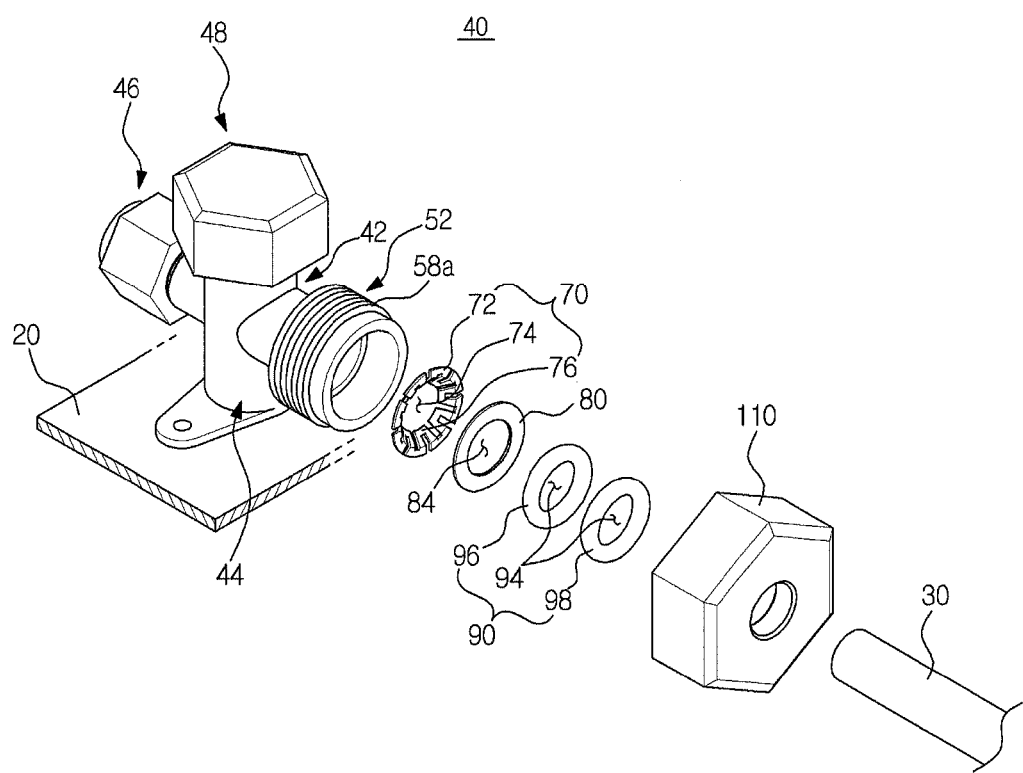
FIG. 2 is an exploded perspective view illustrating a connection relationship between the refrigerant pipe, and a service valve provided on the indoor unit.
Figure 3:
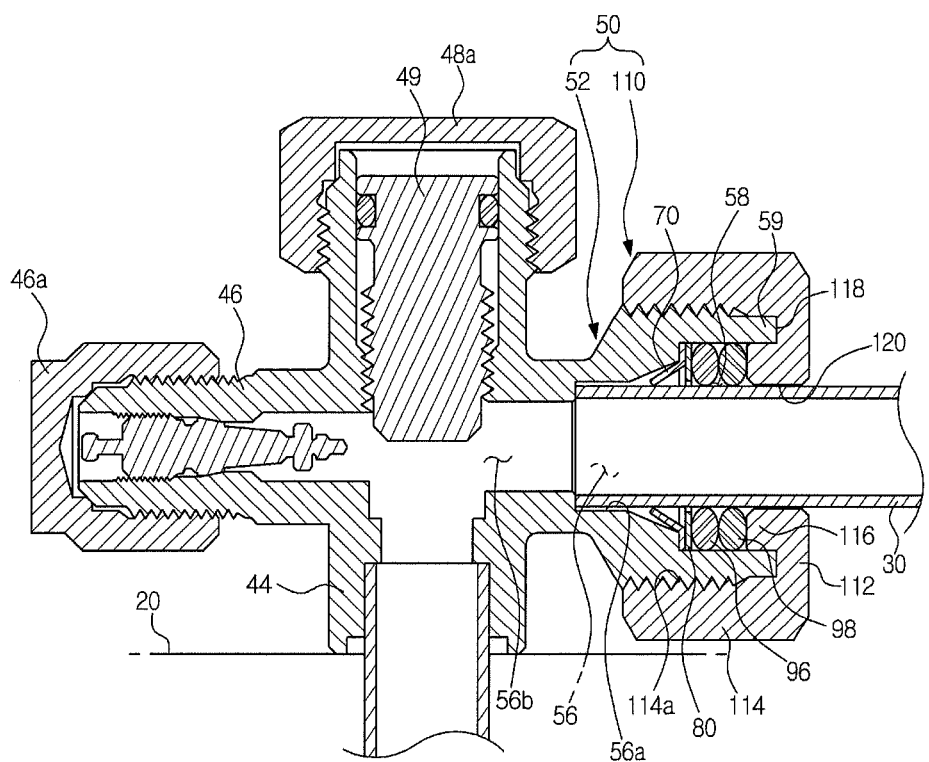
FIG. 3 is a cross-sectional view illustrating a connection state of the service valve and the refrigerant pipe.
Figure 4:
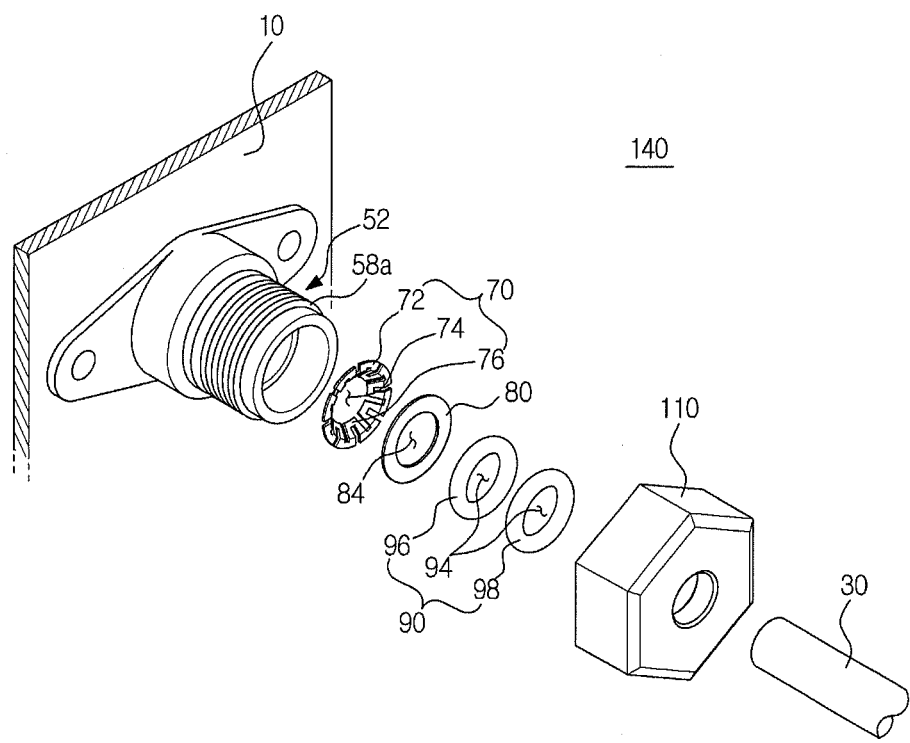
FIG. 4 is an exploded perspective view illustrating the refrigerant pipe and a nipple provided on the indoor unit.
Figure 5:
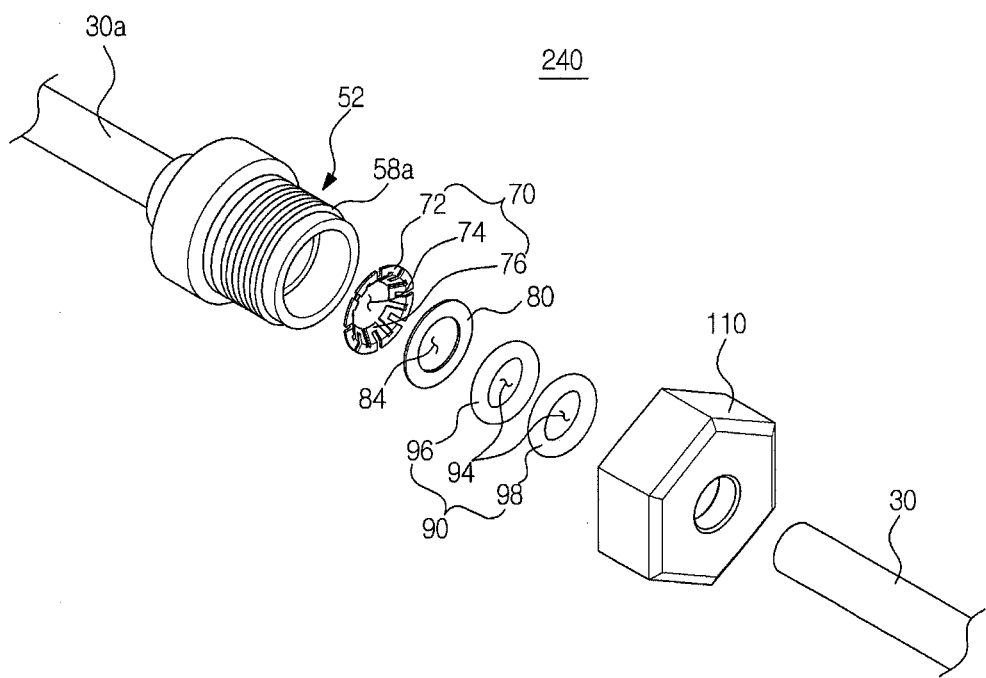
FIG. 5 is an exploded perspective view illustrating a connection relationship between refrigerant pipes.

FIG. 2 is an exploded perspective view illustrating a connection relationship between the refrigerant pipe and a service valve provided on the indoor unit. FIG. 3 is a cross-sectional view illustrating a connection state of the service valve and the refrigerant pipe. FIG. 4 is an exploded perspective view illustrating the refrigerant pipe and a nipple provided on the indoor unit. FIG. 5 is an exploded perspective view illustrating a connection relationship between refrigerant pipes.

Referring to FIGS. 2 and 3, the refrigerant pipe 30 is connected to the outdoor apparatus 20 through the service valve 40 provided on the outdoor unit 20.

The service valve 40 includes a valve body 42; a connecting part 44 configured to connect the valve body 42 to the inside of the outdoor unit 20, an ON/OFF part 46 configured to open/close the valve body, a nipple 50 configured to couple the refrigerant pipe 30 to the valve body 42, and a valve part 48 configured to open/close between the connecting part 44 and the nipple 50.

The ON/OFF part 46 is provided at a position facing the nipple 50. A male screw portion is formed at an end of the ON/OFF part 46 and is screwed to a female screw portion formed inside a valve cap 46a such that the end of the ON/OFF part 46 is hermetically sealed.

The valve part 48 is provided at a position facing the connecting part 44. A check valve 49 is installed on the inside of the valve part 48 to measure the pressure of refrigerant inside the valve body 42. A valve cap 48a is coupled to an end of the valve part 48 to prevent the refrigerant from leaking.

The nipple 50 includes a socket part 52 connected to one end of the refrigerant pipe 30, and a coupling nut 110 coupled to an outer circumferential surface of the socket part 52.

The socket part 52 includes a first accommodation portion 56 to accommodate the refrigerant pipe 30 and a second accommodation portion 58 to accommodate a grip-ring 70, a washer 80, and an O-ring 90.

The first accommodation portion 56 includes a coupling hole 56a, which has a diameter corresponding to that of the refrigerant pipe 30 and to which the refrigerant pipe 30 is insertedly coupled, and a refrigerant passage 56b which communicates with the connecting part 44 and the refrigerant pipe 30 to guide refrigerant passing through the refrigerant pipe 30 to the connecting part 44. The refrigerant passage 56b is opened/closed by the check valve 49 provided on the valve part 48.

At an inner circumferential surface of the second accommodation portion 58, the grip ring 70, the washer 80, and the O-ring 90 are sequentially disposed. The grip-ring 70 serves as a separation preventing member configured to prevent the refrigerant pipe 30 from being separated from the socket part 52. The washer 80 is configured to prevent the O-ring 90 from being damaged. The O-ring 90 servers as a leakage preventing member configured to prevent refrigerant from leaking between the refrigerant pipe 30 and the socket part 52.

The grip ring 70 includes a flange 72 and a grip piece 76. The flange 72 is provided in the shape of a ring having a through-hole 74 having a diameter corresponding to that of the refrigerant pipe 30 such that the refrigerant pipe 30 is coupled to the flange 72 by passing through the through-hole 74. The grip piece 76 extends from the flange 72 toward the center of the refrigerant pipe 30 while being inclined at a predetermined angle. The grip piece 76 presses the refrigerant pipe 30 with a predetermined pressure while being inclined in a coupling direction of the refrigerant pipe 30 in the direction the refrigerant pipe 30 moves when the refrigerant pipe 30 is coupled to the socket part 52. Accordingly, the grip piece 76 allows the refrigerant pipe 30 to move in the coupling direction and not in a separation direction in which the refrigerant pipe 30 is separated from the socket part 52, thereby preventing the refrigerant pipe 30 from being separated from the socket part 52.

The grip ring 70 may include metal, in particular, material having superior corrosion resistance and a strength suitable to prevent the refrigerant pipe 30 from being separated. For example, the grip ring 70 may include stainless steel such as SUS301 to SUS304.

The O-ring 90 is provided in the form of a ring having a through-hole 94 with a diameter corresponding to the refrigerant pipe 30 such that the refrigerant pipe 30 is coupled to the O-ring 90 by passing through the through-hole 94. The O-ring 90 is disposed at a rear side of the grip-ring 70 to prevent refrigerant from leaking. The O-ring 90 may include rubber that can hermetically seal the inside of the socket part 52.

In addition, the O-ring 90 may be provided as a plurality of O-rings, including a first O-ring 96, which makes contact with the washer 80, and a second O-ring 98, which is disposed at a rear side of the first O-ring 96. The second O-ring 98 enables the inside of the socket part 52 to be hermetically sealed even if the first O-ring 96 is damaged due to internal friction. The second O-ring 98 may be provided in plural depending on the size of the socket part 52 and the hermeticity of the inside of the socket part 52.

The washer 80 is provided in the form of a ring having a through-hole 84 with a diameter corresponding to that of the refrigerant pipe 30 such that the refrigerant pipe 30 is coupled to the washer 80 by passing through the through-hole 84. The washer 80 is disposed between the grip-ring 70 and the O-ring 90 to prevent the O-ring 90 from being damaged.

When the grip-ring 70, which may include metal, and the O-ring 90, which may include rubber, are strongly pressed while making contact with each other, the O-ring 90 may be easily damaged due to the difference in hardness between the grip-ring 70 and the O-ring 90. In addition, since a contact area between the grip-ring 70 and the O-ring 90 is small, the damage of the O-ring 90 may be further increased. The washer 80 includes material having a hardness lower than that of the grip-ring 70 and has a larger contact area with the O-ring 90 than a contact area between the grip-ring 70 and the O-ring 90, thereby effectively preventing the O-ring 90 from being damaged.

Meanwhile, the second accommodation portion 58 includes a projection 59 extending in a longitudinal direction of the second accommodation portion 58. The projection 59 makes contact with an accommodation groove 118 formed in the coupling nut 110 to prevent the coupling nut 110 from being excessively coupled to the socket part 52.

The coupling nut 110 is coupled to the outer circumferential surface of the socket part 52 such that the grip-ring 70, the washer 80, and the O-ring 90 are pressed against the inside of the socket part 52, thereby completely fixing the refrigerant pipe 30 to the socket part 52.

In order for the coupling nut 110 to apply pressure to the grip ring 70, the washer 80, and the O-ring 90, a male screw portion 58a is formed in the second accommodation portion, and a female screw portion 114a is formed in the inner circumferential surface of the coupling nut 110 such that the socket part 52 is screwed to the coupling nut 110.

The coupling nut 110 includes a support portion 112, a connecting portion 114, a pressing projection 116, an accommodation groove 118, and a through-hole 120. The connecting portion 114 extends from a periphery of the support portion 112 in the coupling direction of the coupling nut 110. The pressing projection 116 projects from the support portion 112 in the coupling direction of the coupling nut 110 to press a rear side of the O-ring 90. The accommodation groove 118 is configured to the projection 59 provided on the second accommodation portion 58. The through-hole 120 has a diameter corresponding to the refrigerant pipe 30 such that the refrigerant pipe 30 is coupled to the coupling nut 110 by passing through the through-hole 120.

The female screw portion 114a is formed on an inner circumferential surface of the connecting portion 114 to correspond to the male screw portion 58a formed on the outer circumferential surface of the socket part 52 such that the coupling nut 110 is screwed to the socket part 52.

The pressing projection 116 projects from the support portion 112 in the coupling direction of the coupling nut 110 while forming a step in cooperation with the support portion 112. The pressing projection 116 has a length that allows the O-ring 90 to be compressed with a width reduction of approximately 20% to 30% when the pressing projection 116 compresses the rear side of the O-ring 90 such that the coupling nut 110 is completely coupled to the socket part 52. As the width of the O-ring 90 pressed by the pressing projection 116 is reduced, the O-ring 90 is flattened, and thus the inside of the socket part 52 is more securely sealed.

The accommodation groove 118 is provided on a support surface between the connecting portion 114 and the pressing projection 116. The accommodation groove 118 accommodates the projection 59 in a state that the coupling nut 110 is coupled to the socket part 52. As described above, the accommodation groove 118 makes contact with the projection 59 to prevent the coupling nut 110 from being excessively coupled to the socket part 52. Before the coupling nut 110 is excessively coupled to the socket part 52, the accommodation groove 118 makes contact with the projection 59 to prevent the coupling nut 110 from moving in a direction in which the refrigerant pipe 30 is coupled, thereby preventing the grip-ring 70, the washer 80, and the O-ring 90 from being excessively pressed by the pressing projection and damaged.

Referring to FIGS. 4 and 5, the refrigerant pipe 30 may be connected to the indoor unit 10 and another refrigerant pipe 30a through the connection apparatuses 140 and 240, respectively. Each of the connection apparatuses 140 has the same structure as that of the nipple provided on the service valve 40, and detailed description thereof will be omitted.

Meanwhile, the refrigerant pipe 30, which is used in the structure to connect a refrigerant pipe according to the embodiment of the present disclosure, may have a surface including aluminum, an aluminum alloy, or copper, which is generally used in an air conditioner, and may be coated with a synthetic resin.

As described above, the structure to connect a refrigerant pipe according to an embodiment of the present disclosure does not require processing an end portion of the refrigerant pipe 30 to couple the refrigerant pipe 30 to the nipple 50. In addition, the structure to connect a refrigerant pipe according to the embodiment of the present disclosure allows the use of aluminum or an aluminum alloy coated with synthetic resin as material of the refrigerant pipe 30, so that the material cost is reduced, and corrosion is prevented, thereby providing improved reliability.

Figure 6:
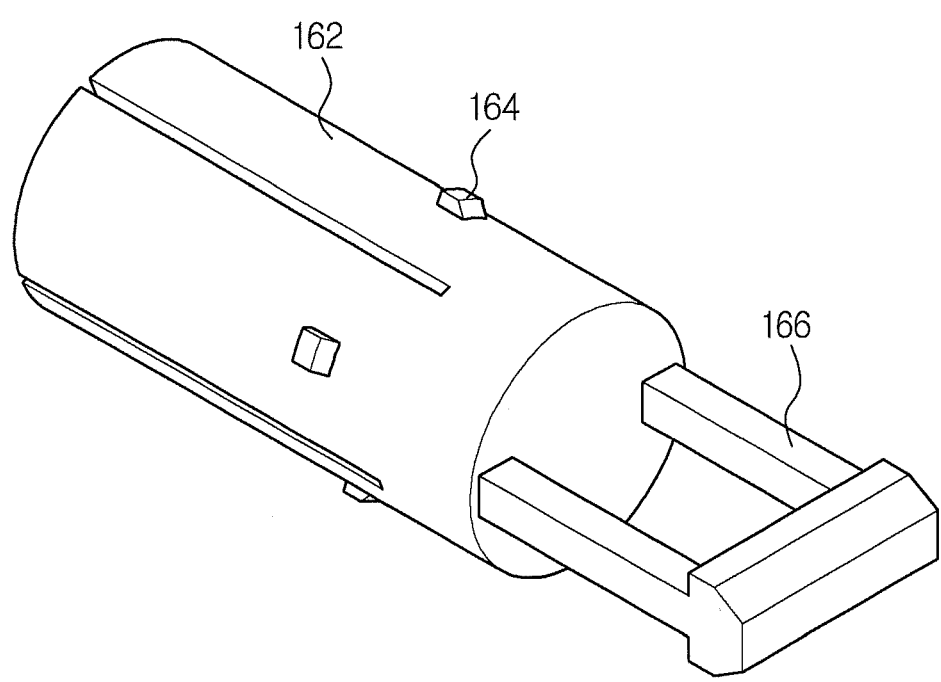
FIG. 6 is a perspective view illustrating an assembling jig used to connect a refrigerant pipe according to an embodiment of the present disclosure.
Figure 7:
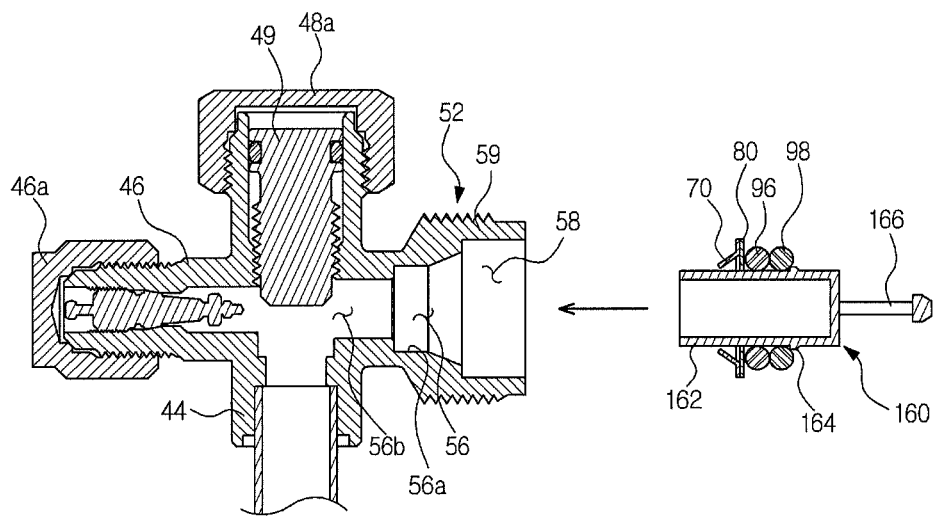
FIGS. 7 to 10 are views showing a process of assembling the service valve to the refrigerant pipe by use of the assembling jig according to an embodiment of the present disclosure.
Figure 8:
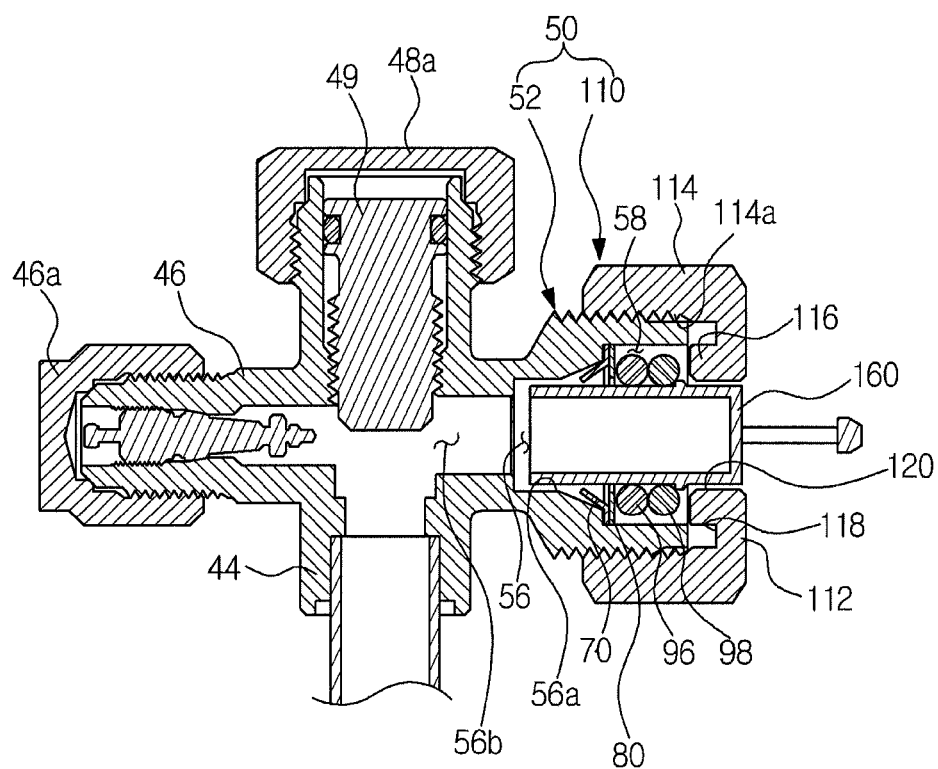
Figure 9:
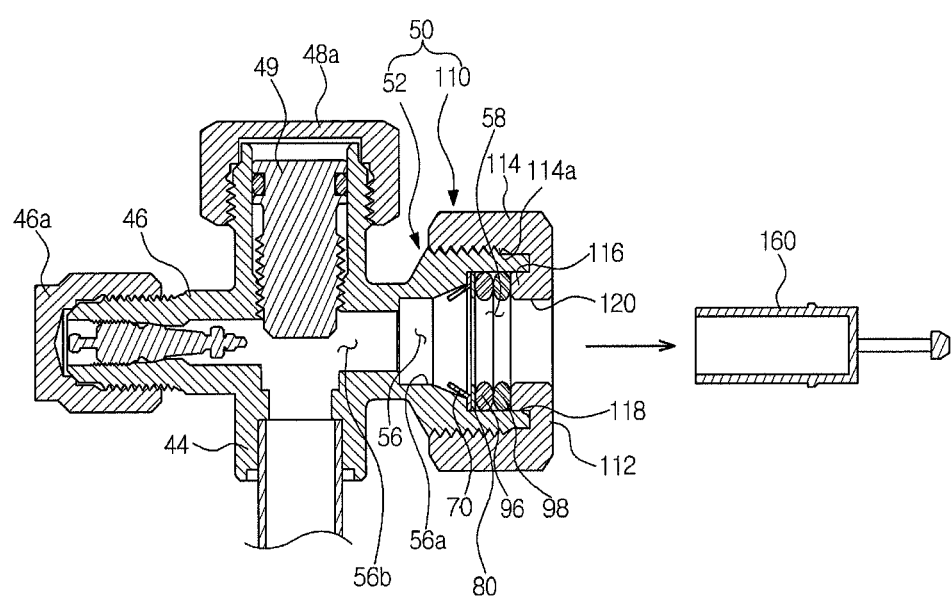
Figure 10:
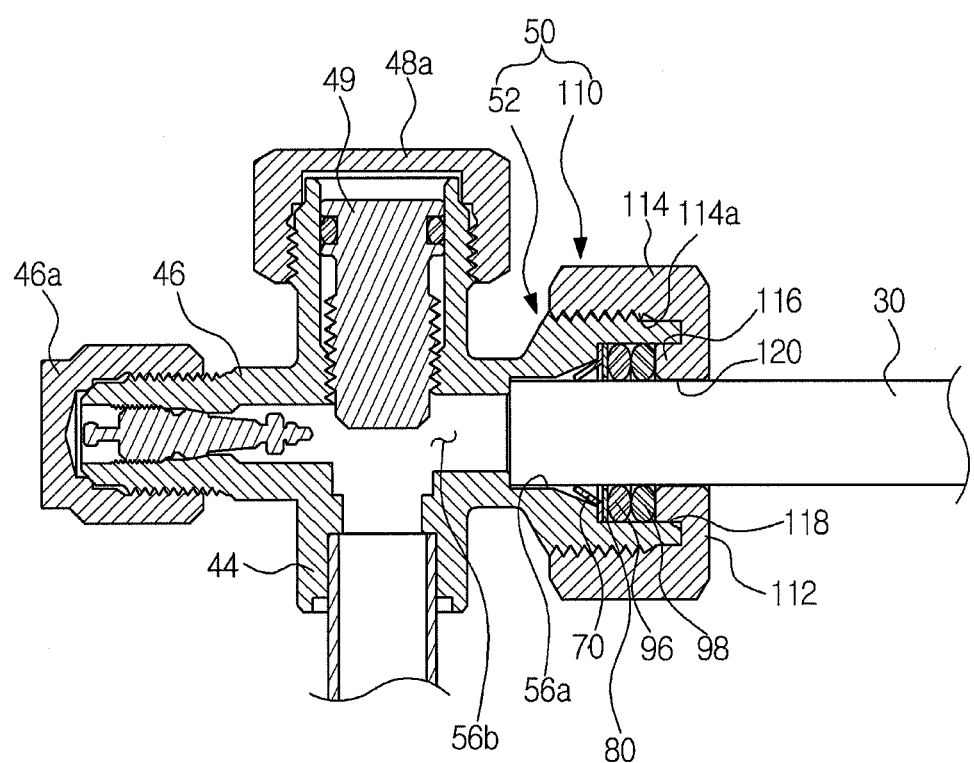

FIG. 6 is a perspective view illustrating an assembling jig used to connect a refrigerant pipe according to an embodiment of the present disclosure.

Referring to FIGS. 6 to 10, the grip-ring 70, the washer 80, and the O-ring 90 are inserted into the second accommodation portion 58 of the socket part 52 through an assembling jig 160.

The assembling jig 160 includes a coupling portion 162, a support protrusion 164, and a handle 166. The coupling portion 162 is formed at an outer circumferential surface of the assembling jig 160 to couple to the grip-ring 70, the washer 80, and the O-ring 90. The support protrusion 164 protrudes along a circumference of the outer circumferential surface of the assembling jig 160 to support the grip-ring 70, the washer 80, and the O-ring 90. The handle 166 is configured to allow the assembling jig 160 to be held.

The coupling portion 162 is provided in the form of an approximate cylinder having a diameter corresponding to the through-holes 74, 84, and 94, which are formed through the grip-ring 70, the washer 80, and the O-ring 90, respectively. The support protrusion 164 protrudes from the outer circumferential surface of the coupling portion 162 by a predetermined length to prevent the grip-ring 70, the washer 80, and the O-ring 90 from being separated from the coupling portion 162 when the assembling jig 160 is inserted into the socket part 52.

As described above, the grip-ring 70, the washer 80, and the O-ring 90 are simultaneously coupled, thereby preventing erroneous assembling.

Hereafter, a process of assembling the service valve 40 to the refrigerant pipe 30 will be described in detail.

Referring to FIGS. 7 to 10, the coupling nut 110 coupled to the socket part 52 is separated, and then the assembling jig 160 having the grip-ring 70, the washer 80, and the O-ring 90 coupled thereto is inserted into the second accommodation portion 58 of the socket part 52.

Thereafter, the coupling nut 110 is again coupled to the socket part 52 in a state that the assembling jig 160 is inserted into the socket part 52. In this case, the coupling nut 110 is not completely coupled. In this state, the assembling jig 160 inserted into the socket part 52 is separated by passing through the through-hole 120 of the coupling nut 110, but the grip-ring 70, the washer 80, and the O-ring 90, which are supported by the pressing projection 116, are not separated.

After the assembling jig 160 is separated, the refrigerant pipe 30 is inserted into the socket part 52 through the through-hole 120. At this time, the refrigerant pipe 30 is completely inserted to the first accommodation portion 56 formed in the socket part 52. Since the refrigerant pipe 30 is sequentially guided by the through-holes 120, 74, 84, and 94 and the coupling hole 56a, a worker easily inserts the refrigerant pipe 30.

Thereafter, in a state that the refrigerant pipe 30 is completed inserted into the socket part 52, the coupling nut 110 is completely fastened to the socket part 52 by use of a tool such as a spanner, for example.

Figure 11:
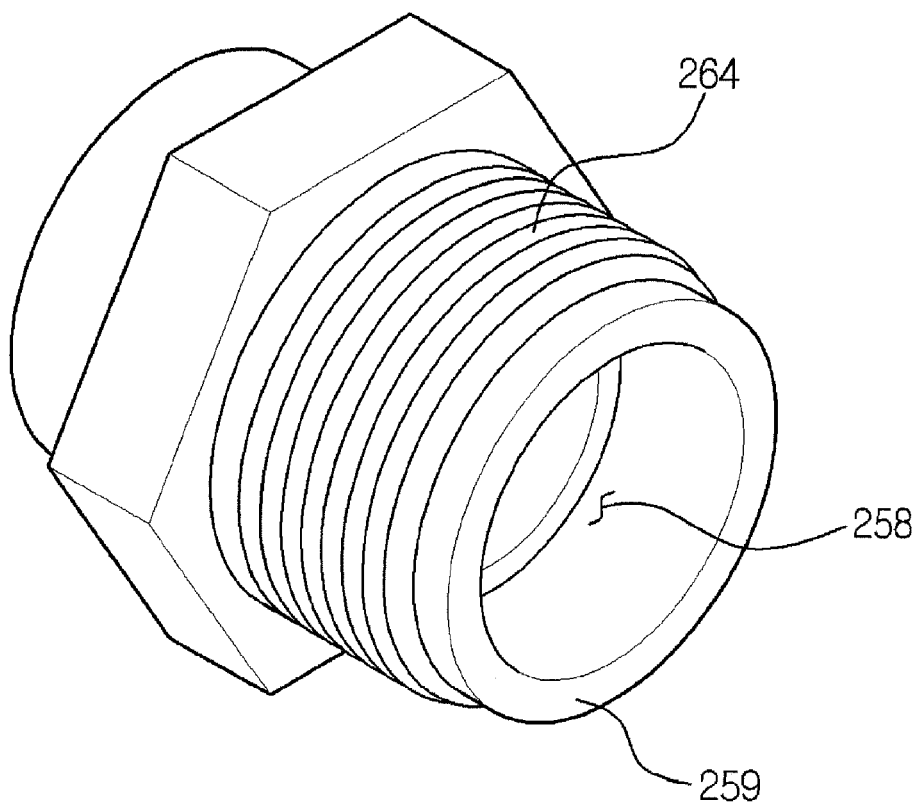
FIG. 11 is a perspective view illustrating an assembling jig used to connect a refrigerant pipe according to an embodiment of the present disclosure.
Figure 12:
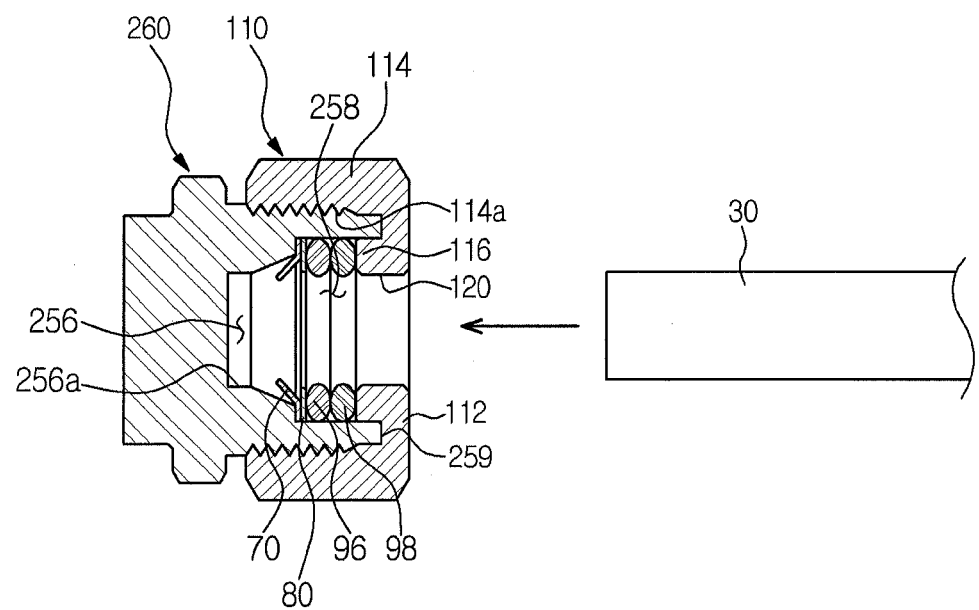
FIGS. 12 to 15 are views showing a process of assembling the service valve to the refrigerant pipe by use of the assembling jig according to an embodiment of the present disclosure.
Figure 13:
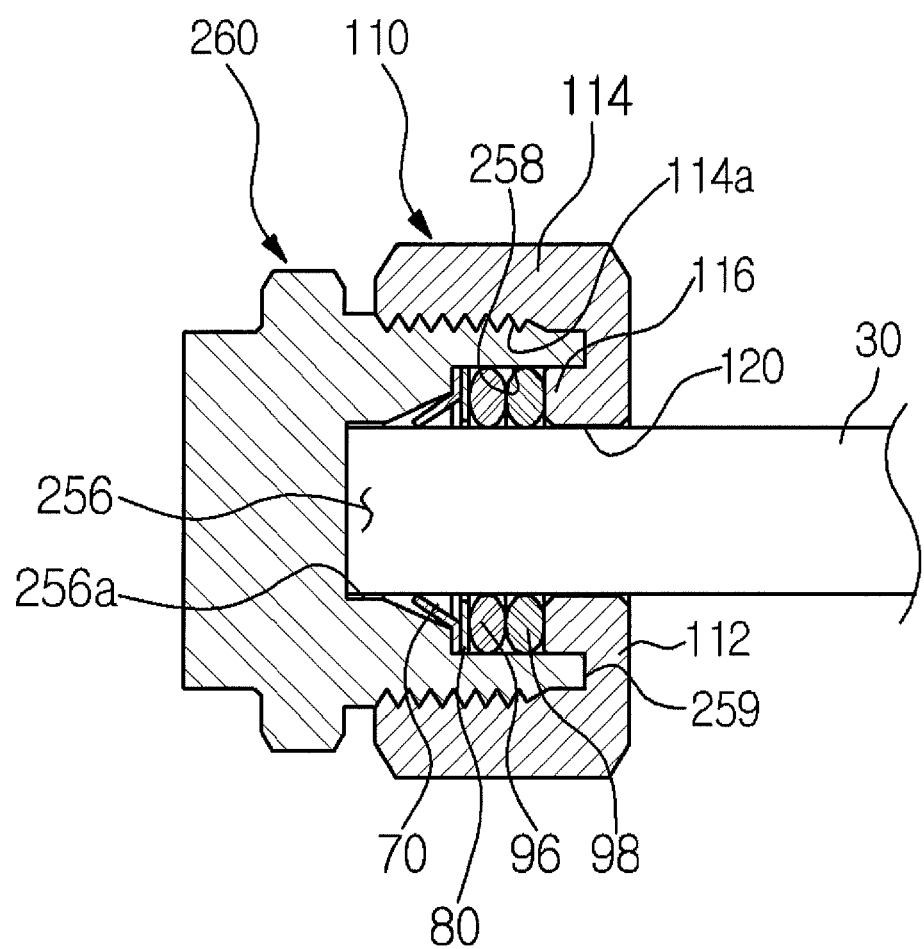
Figure 14:
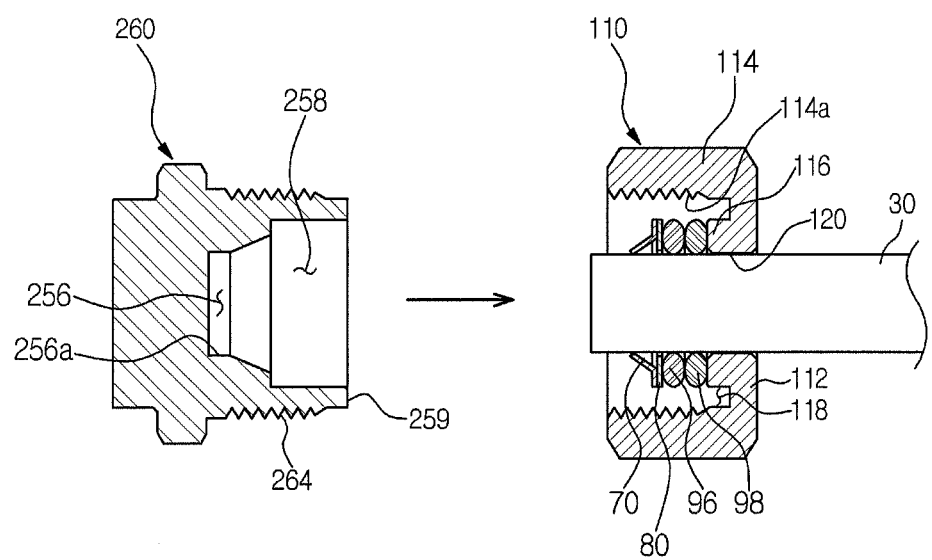
Figure 15:
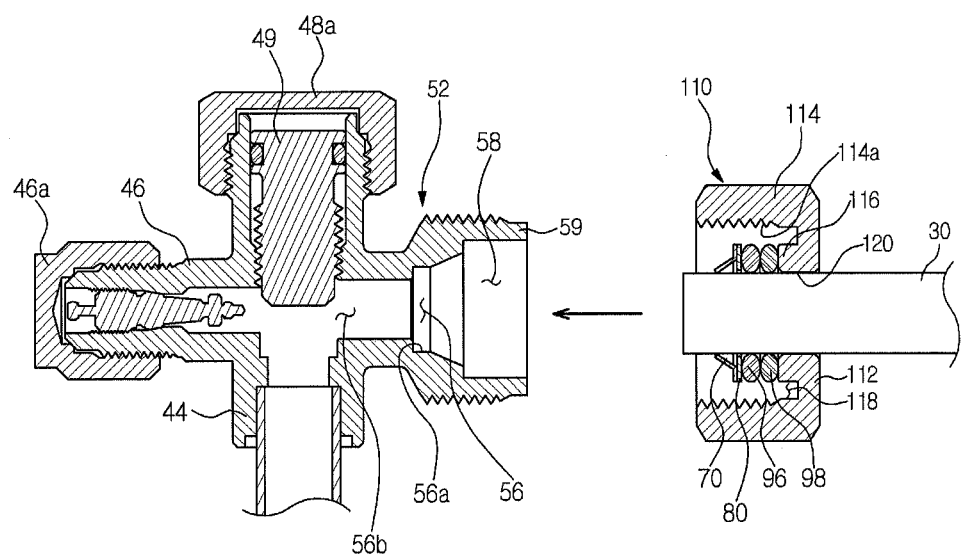

FIG. 11 is a perspective view illustrating an assembling jig used to connect a refrigerant pipe according to an embodiment of the present disclosure. FIGS. 12 to 15 are views showing a process of assembling the service valve to the refrigerant pipe by use of the assembling jig according to the embodiment of the present disclosure.

Referring to FIGS. 11 to 15, the grip-ring 70, the washer 80, and the O-ring 90 are inserted into the second accommodation portion 58 of the socket part 52 in a state that the grip-ring 70, the washer 80, and the O-ring 90 are coupled to the refrigerant pipe 30 through an assembling jig 260.

The assembling jig 260 includes a first jig side accommodation portion 256 to accommodation the refrigerant pipe 30 and a second jig side accommodation portion 258 to accommodate the grip-ring 70, the washer 80, and the O-ring 90.

The assembling jig 260 is provided at an outer circumferential surface thereof with a male screw portion 264 to which the coupling nut 110 is screwed.

The first jig side accommodation portion 256 has a jig-side coupling hole 256a having a diameter corresponding to that of the refrigerant pipe 30 such that the refrigerant pipe 30 is inserted into the jig-side coupling hole 256a.

The second jig-side accommodation portion 258 has an inner circumferential surface on which the grip-ring 70, the washer 80, and the O-ring 90 are sequentially disposed and coupled. The second jig-side accommodation portion 258 is provided at an end thereof with a jig-side projection 259 that extends in a longitudinal direction of the second jig-side accommodation portion 258. The jig-side projection 259 makes contact with the accommodation groove 118 of the coupling nut 110 to prevent the coupling nut 110 from being excessively coupled to the assembling jig 260.

The assembling jig 260 is provided in a state that the grip-ring 70, the washer 80, and the O-ring 90 are coupled to the inner side of the assembling jig 260, and the coupling nut 110 is coupled to the outer side of the assembling jig 260. If the refrigerant pipe 30 is inserted into the assembling jig 260 having the grip-ring 70, the washer 80, the O-ring 90, and the coupling nut 110 assembled thereto, the grip-piece 76 of the grip-ring 70 is fixed to the refrigerant pipe 30 while pressing the refrigerant pipe 30 in an opposite direction to the coupling direction of the refrigerant pipe 30, and the washer 80 and the O-ring 90 are disposed on a circumferential surface of the refrigerant pipe 30 between the grip-ring 70 and the coupling nut 110. Accordingly, after the inserting of the refrigerant pipe 30 is completed, even if the assembling jig 260 is separated, the grip-ring 70, the washer 80, the O-ring 90, and the coupling nut 110 remain coupled to the refrigerant pipe 30. The refrigerant pipe 30 having the grip-ring 70, the washer 80, the O-ring 90, and the coupling nut 110 coupled thereto is coupled to the socket part 52 of the service valve 40.

As described above, the assembling jig 260 allows the grip-ring 70, the washer 80, and the O-ring 90 to be simultaneously coupled, thereby preventing an erroneous assembly and reducing the time required to connect the refrigerant pipe 30.

Hereinafter, a process of assembling the service valve 40 to the refrigerant pipe 30 by use of the assembling jig 260 is described in detail.

Referring to FIGS. 12 to 15, the refrigerant pipe 30 is inserted into the assembling jig 260 with a predetermined pressure in a state that the grip-ring 70, the washer 80, the O-ring 90, and the coupling nut 110 are coupled to the assembling jig.

The assembling jig 260 is separated in a state that the grip-ring 70, the washer 80, the O-ring 90, and the coupling nut 110 are coupled to the refrigerant pipe 30. The refrigerant pipe 30 having the grip-ring 70, the washer 80, the O-ring 90, and the coupling nut 110 coupled thereto is coupled to the service valve 40 until the refrigerant pipe 30 is completely inserted into the first accommodation portion 56 of the socket part 52.

In a state that the refrigerant pipe 30 is completely inserted into the socket part 52, the coupling nut 110 is completely fastened to the socket part 52 by a tool such as a spanner, for example.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of connecting a refrigerant pipe with an assembling jig of an air conditioner having an indoor unit and an outdoor unit, the method comprising:
    preparing the assembling jig and locating a grip-ring, a washer, at least one O-ring on an outside portion of the assembling jig, the grip-ring configured to prevent the refrigerant pipe from being separated, the washer configured to prevent the O-ring from being damaged, the at least one O-ring configured to prevent refrigerant from leaking;
    inserting the assembling jig into a refrigerant pipe connection part of the outdoor unit;
    coupling a coupling nut to an outer circumferential surface of the refrigerant pipe connection part in a loosely fastening state of the coupling nut;
    separating the assembling jig from the refrigerant pipe connection part via a hole formed through the coupling nut when the coupling nut is in the loosely fastened state;
    inserting the refrigerant pipe into the refrigerant pipe connection part by passing through through-holes, which are respectively formed in centers of the grip-ring, the washer, and the O-ring; and
    fastening the coupling nut to at least a predetermined torque such that the coupling nut presses the O-ring inward to the refrigerant pipe connection part.

2. A method of connecting a refrigerant pipe with an assembling jig of an air conditioner having an indoor unit and an outdoor unit, the method comprising:
    preparing an assembling jig, locating a grip-ring, a washer, at least one O-ring on an inside portion of the assembling jig and coupling a coupling nut on an outside portion of the assembling jig;
    inserting the refrigerant pipe into the assembling jig;
    separating the assembling jig from the coupling nut, wherein in a state that a grip-ring, a washer, at least one O-ring and the coupling nut is coupled to the outer circumference surface of the refrigerant pipe, the grip-ring configured to prevent the refrigerant pipe from being separated, the washer configured to prevent the at least one O-ring from being damaged, the at least one O-ring configured to prevent refrigerant from leaking, and the coupling nut configured to couple the refrigerant pipe;
    inserting the refrigerant pipe, the grip-ring, the washer, and the O-ring into a refrigerant pipe connection part of the outdoor unit in a state that the grip-ring, the washer, the O-ring, and the coupling nut are coupled to the refrigerant pipe;
    fastening the coupling nut on the refrigerant pipe to an outer side of the refrigerant pipe connection part.

3. A method of connecting a refrigerant pipe with an assembling jig of an air conditioner having an indoor unit and an outdoor unit, the method comprising:
    preparing an assembling jig, locating a grip-ring, a washer, at least one o-ring on an inside portion of the assembling jig and coupling a coupling nut on an outside portion of the assembling jig;
    inserting the refrigerant pipe into the assembling jig;
    separating the assembling jig from the coupling nut, wherein in a state that a grip-ring, a washer, at least one o-ring and the coupling nut is coupled to the outer circumference surface of the refrigerant pipe, the grip-ring configured to prevent the refrigerant pipe from being separated, the washer configured to prevent the at least one o-ring from being damaged, the at least one O-ring configured to prevent refrigerant from leaking, and the coupling nut configured to couple the refrigerant pipe;
    inserting the refrigerant pipe, the grip-ring, the washer, and the O-ring into a refrigerant pipe connection part of the indoor unit in a state that the grip-ring, the washer, the O-ring, and the coupling nut are coupled to the refrigerant pipe; and
    fastening the coupling nut on the refrigerant pipe to an outer side of the refrigerant pipe connection part.

* * * * *